United States Patent
Cho et al.

(10) Patent No.: US 10,555,213 B2
(45) Date of Patent: Feb. 4, 2020

(54) OPERATION METHOD OF COMMUNICATION NODE IN COMMUNICATION NETWORK

(71) Applicant: Electronics and Telecommunications Research Institute, Daejeon (KR)

(72) Inventors: Seung Kwon Cho, Daejeon (KR); Won Ik Kim, Daejeon (KR); Seung Kwon Baek, Daejeon (KR); Jae Su Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 39 days.

(21) Appl. No.: 15/886,412

(22) Filed: Feb. 1, 2018

(65) Prior Publication Data

US 2018/0234882 A1   Aug. 16, 2018

(30) Foreign Application Priority Data

Feb. 10, 2017  (KR) .................... 10-2017-0018845

(51) Int. Cl.
*H04W 28/06* (2009.01)
*H04W 72/04* (2009.01)
(Continued)

(52) U.S. Cl.
CPC ..... *H04W 28/065* (2013.01); *H04W 72/0426* (2013.01); *H04W 72/1278* (2013.01); *H04W 88/04* (2013.01); *H04W 80/02* (2013.01)

(58) Field of Classification Search
None
See application file for complete search history.

(56) References Cited

U.S. PATENT DOCUMENTS

| 7,937,110 B2 | 5/2011 | Wu et al. |
| 8,498,659 B2 | 7/2013 | He et al. |

(Continued)

FOREIGN PATENT DOCUMENTS

| KR | 101666568 B1 | 10/2016 |
| KR | 20160137420 A | 11/2016 |

OTHER PUBLICATIONS

Chih-Lin et al., Special Section on Recent Advances in Cloud Radio Access Networks, "Recent Progress on C-RAN Centralization and Cloudification", Aug. 22, 2014, pp. 1030-1039, vol. 2, IEEE Access, China.

(Continued)

*Primary Examiner* — Peter Chen
*Assistant Examiner* — Jeff Banthrongsack
(74) *Attorney, Agent, or Firm* — William Park & Associates Ltd.

(57) ABSTRACT

An operation method of a first communication node in a communication network, which supports a radio link control (RLC) function among functions of a base station, may comprise receiving a first message from a second communication node supporting a packet data convergence protocol (PDCP) function among the functions of the base station; processing the received first message by performing the RLC function; and transmitting the processed first message to a third communication node supporting a medium access control (MAC) function and physical (PHY) functions among the functions of the base station.

10 Claims, 10 Drawing Sheets

(51) Int. Cl.
    *H04W 88/04*     (2009.01)
    *H04W 72/12*     (2009.01)
    *H04W 80/02*     (2009.01)

(56) References Cited

U.S. PATENT DOCUMENTS

| | | | |
|---|---|---|---|
| 8,862,170 B2 * | 10/2014 | Lee | H04W 88/085 |
| | | | 455/507 |
| 8,897,225 B2 | 11/2014 | Lee et al. | |
| 8,948,062 B2 | 2/2015 | Miyata | |
| 9,112,758 B2 | 8/2015 | Niu et al. | |
| 9,392,617 B2 | 7/2016 | Lee et al. | |
| 2013/0148596 A1 | 6/2013 | Shin et al. | |
| 2016/0315674 A1 | 10/2016 | Li et al. | |
| 2018/0159611 A1 * | 6/2018 | Majmundar | H04L 47/38 |

OTHER PUBLICATIONS

Seungkwon Cho et al., Korea Telecom Association 2017 Winter Synthesis Conference, "Hierarchical Centralization Based on Xhaul", 2017, pp. 1353-1354, ETRI, Republic of Korea.

\* cited by examiner

OPERATION METHOD OF COMMUNICATION NODE IN COMMUNICATION NETWORK

CROSS-REFERENCE TO RELATED APPLICATIONS

This application claims priority to Korean Patent Application No. 10-2017-0018845 filed on Feb. 10, 2017 in the Korean Intellectual Property Office (KIPO), the entire contents of which are hereby incorporated by reference.

BACKGROUND

1. Technical Field

The present disclosure relates to an operation method of a communication node in a communication network, and more specifically, to an operation method of a communication node for supporting functional split of a base station in a communication network.

2. Related Art

In order to support rapidly increasing traffic in a mobile communication environment, the number of base stations is rapidly increasing. However, the increase of the number of base stations may cause heavy installation and operation cost burdens on mobile communication operators. Accordingly, in a recent mobile communication environment, a method of dividing functional elements of a base station based on a centralized (or, cloud) radio access network (C-RAN) structure having high efficiency for installation and operation is being utilized.

Such the C-RAN structure is a structure in which functional elements of a base station are divided into two entities, and physically separated entities are respectively installed and operated. Specifically, a base station in the C-RAN structure may be divided into a digital unit (DU) for processing digital data of the base station and a radio unit (RU) for transmitting and receiving radio signals of the base station. Also, in the C-RAN structure, DUs for a plurality of RUs may be located in the same place (e.g., a central office of a mobile communication operator).

Also, in the C-RAN structure, a 'fronthaul' may be defined between the RU and the DU, and the fronthaul may be configured with a fronthaul interface. For example, the fronthaul interface may be one of a common public radio interface (CPRI) and an open base station architecture initiative (OBSAI). Here, latency and jitter of the fronthaul interface used in the C-RAN structure may have relatively-strict requirements. Accordingly, in the C-RAN structure, the fronthaul is usually formed using optical fiber cables.

Meanwhile, research on fifth generation (5G) mobile communications has been progressing actively, and limitations of the C-RAN structure based on the fronthaul interface such as the conventional CPRI have appeared. In order to overcome the limitations of the C-RAN structure, a method of dividing the functional elements of the base station on a higher layer in a communication protocol stack than the conventional CPRI has been proposed. That is, a method of dividing the functional elements of the base station on a higher layer in a communication protocol stack than the conventional CPRI may correspond to a method of dividing a base station into at least one distributed unit (DU) corresponding to the RU and a centralized unit (CU) corresponding to the digital unit (DU).

Also, a 'midhaul' may be defined between the distributed unit (DU) and the CU, and research is underway to configure the midhaul as a packet-switching based network such as Ethernet. However, there is a problem that it is difficult for the midhaul formed using the packet-switching based network to support the CPRI-based C-RAN structure.

SUMMARY

Accordingly, embodiments of the present disclosure provide an operation method of a communication node for efficiently satisfying functional split requirements while supporting functional split of a base station in a communication network.

In order to achieve the objective of the present disclosure, an operation method of a first communication node in a communication network, which supports a radio link control (RLC) function among functions of a base station, may comprise receiving a first message from a second communication node supporting a packet data convergence protocol (PDCP) function among the functions of the base station; processing the received first message by performing the RLC function; and transmitting the processed first message to a third communication node supporting a medium access control (MAC) function and physical (PHY) functions among the functions of the base station.

When the first communication node supports the RLC function and further supports the MAC function among the functions of the base station, the operation method may further comprise receiving a second message from the second communication node; processing the received second message by performing the RLC function and the MAC function; and transmitting the processed second message to a fourth node supporting the PHY functions among the functions of the base station.

When the first communication node supports the RLC function and the MAC function among the functions of the base station and further supports at least one of the PHY functions among the functions of the base station, the operation method may further comprise receiving a third message from the second communication node; processing the received third message by performing the RLC function, the MAC function, and the at least one of the PHY functions among the functions of the base station; and transmitting the processed third message to a fifth node supporting a PHY function which is not supported by the first communication node among the PHY functions of the base station.

The at least one of the PHY functions may be a function divided from the PHY functions based on a common public radio interface (CPRI).

The communication network may be a cloud radio access network (C-RAN) in which the functions of the base station are performed as divided.

The functions of the base station may be divided based on characteristics required at an interface between the first communication node and the second communication node and characteristics required at an interface between the first communication node and the third communication node in a protocol stack of the communication network.

A network between the first communication node and the second communication node may be a network in which a control plane and a user plane are separated.

When a network between the first communication node and the second communication node is a packet-switching based network, a network between the first communication node and the third communication node may be a circuit-switching based network.

A network between the first communication node and the second communication node may be an exclusive network different from a network between the first communication node and the third communication node.

A network between the first communication node and the second communication node and a network between the first communication node and the third communication node may be integrated into a unified network.

In order to achieve the objective of the present disclosure, a first communication node in a communication node may comprise a processor and a memory storing at least one instruction executed by the processor, and support at least one of physical (PHY) functions of a base station. Here, the at least one instruction may be configured to receive a message from a second communication node supporting a packet data convergence protocol (PDCP) function, a radio link control (RLC) function, and a medium access control (MAC) function among functions of the base station; process the received message by performing the at least one of PHY functions of the base station; and transmit the processed message to a third communication node supporting a PHY function which is not supported by the first communication node among the PHY functions of the base station.

The at least one of PHY functions of the base station may be a function divided from the PHY functions based on a common public radio interface (CPRI).

The communication network may be a cloud radio access network (C-RAN) in which the functions of the base station are performed as divided.

The functions of the base station may be divided based on characteristics required at an interface between the first communication node and the second communication node and characteristics required at an interface between the first communication node and the third communication node in a protocol stack of the communication network.

When a network between the first communication node and the second communication node is a packet-switching based network, a network between the first communication node and the third communication node may be a circuit-switching based network.

A network between the first communication node and the second communication node may be an exclusive network different from a network between the first communication node and the third communication node.

A network between the first communication node and the second communication node and a network between the first communication node and the third communication node may be integrated into a unified network.

According to the embodiments of the present disclosure, it is made possible to support a CPRI-based fronthaul in the C-RAN structure and a midhaul according to functional split of a base station in a higher layer than the CPRI in a protocol stack, so that the advantages of the centralized C-RAN structure can be maximized.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
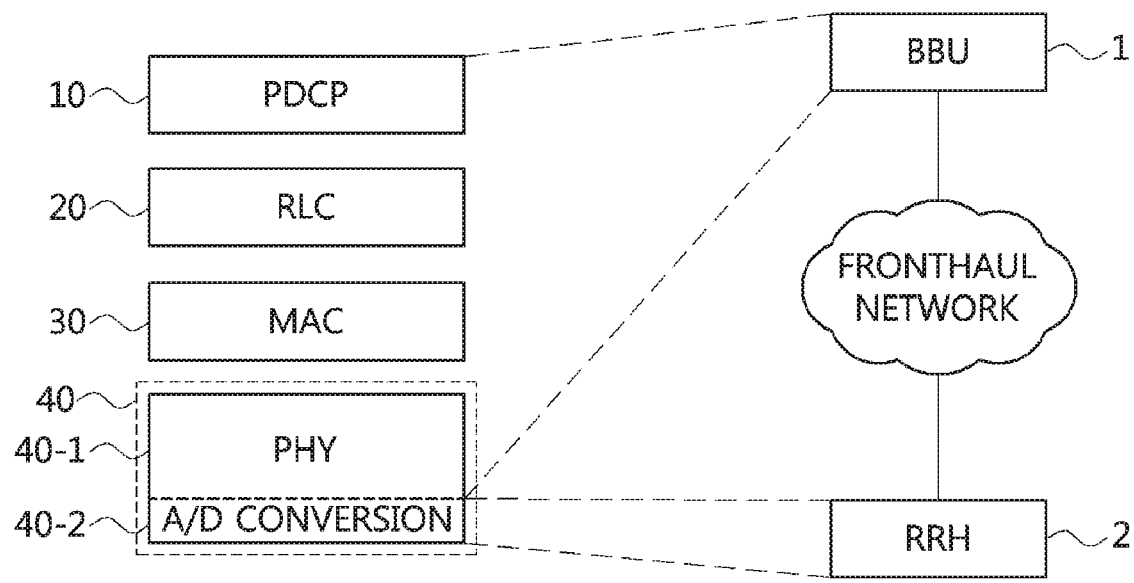
FIG. 1 is a conceptual diagram illustrating a first embodiment in which functions of a base station are divided in a communication network.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication network to be described below may mean a communication network in which functions of a base station is divided and supported or performed by a plurality of apparatuses (e.g., the DUs and CU as described above). Specifically, the functions of the base station in the communication network may be divided on functions supported by a plurality of layers included in a protocol stack of the communication network.

For example, the functions supported by the plurality of layers may include a packet data convergence protocol (PDCP) function 10, a radio link control (RLC) function 20, a medium access control (MAC) function 30, and a physical (PHY) function 40.

Specifically, in the communication network, the PDCP function 10 may include a function of compressing an IP header of a message, or a function of decompressing the compressed IP header. Also, the PDCP function 10 may include a function of encrypting an unencrypted message, a function of deciphering the encrypted message, and the like.

Also, in the communication network, the RLC function 20 may include a function of segmenting a message, and a function of concatenating a plurality of segmented message fragments based on a sequence and transmitting the concatenated message fragments to an upper layer. Also, in the communication network, the MAC function 30 may include a function for controlling hybrid automatic repeat request (HARD) retransmissions, and a scheduling function for an uplink (UL) and a downlink (DL).

In the communication network, the PHY function 40 may include a function of coding and decoding a message, a function of modulating and demodulating a message, a function of mapping an antenna and a resource, and the like.

Hereinafter, with reference to FIGS. 1 and 2, a method of dividing functions of a base station in the communication network will be described in detail.

FIG. 1 is a conceptual diagram illustrating a first embodiment in which functions of a base station are divided in a communication network.

Referring to FIG. 1, a base station in a communication network may include a base band unit (BBU) 1 and a remote radio head (RRH) 2 for performing a plurality of divided functions. For example, the BBU 1 may support a PDCP function 10, an RLC function 20, and a MAC function 30 among the plurality of divided functions of the base station. Also, the BBU 1 may further support at least one of a PHY function 40-1 among PHY functions of the base station. Also, the RRH 2 may support at least one a PHY function 40-2 that is not supported by the BBU 1.

That is, the BBU 1 and the RRH 2 may support a PHY function that is not supported by each other among the PHY functions of the base station. Here, the PHY function performed in the BBU 1 and the PHY function performed in the RRH 2 may mean functions divided from the PHY functions of the base station based on a CPRI.

As such, the divided functions of the base station may be supported by the BBU 1 and the RRH 2. Here, a network section between the BBU 1 and the RRH 2 may be defined as a fronthaul. Thus, in the following description, the fronthaul may have the same meaning as a fronthaul network.

Figure 2:
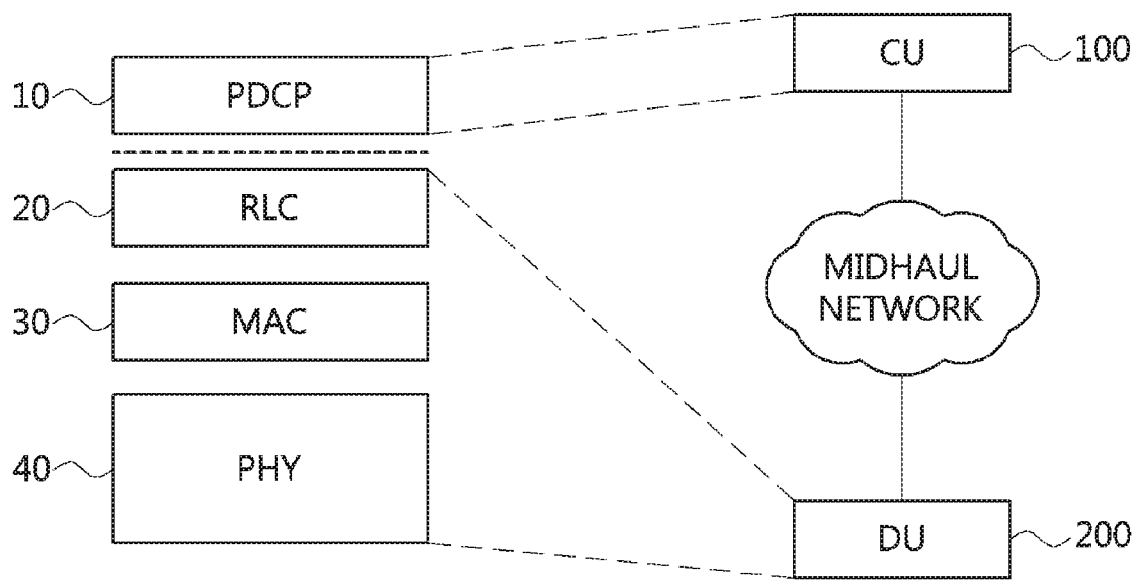
FIG. 2 is a conceptual diagram illustrating a second embodiment in which functions of a base station are divided in a communication network.

FIG. 2 is a conceptual diagram illustrating a second embodiment in which functions of a base station are divided in a communication network.

Referring to FIG. 2, a base station in a communication network may include a centralized unit (CU) 100 and at least one distributed unit (DU) 200 for performing a plurality of divided functions. For example, the CU 100 may support the PDCP function 10 among the plurality of divided functions of the base station. Also, the DU 200 may further support the RLC function 20, the MAC function 30, and the PHY functions 40.

As such, the divided functions of the base station may be supported by the CU 100 and the DU 200. Here, a network section between the CU 100 and the DU 200 may be defined as a 'midhaul'. Thus, in the following description, the midhaul may have the same meaning as a midhaul network.

As described above, the plurality of divided functions of the base station in the communication network may be supported or performed through a plurality of entities. Also, the BBU 1 described with reference to FIG. 1 and the CU 100 described with reference to FIG. 2 may refer to apparatuses corresponding to each other. Also, the RRH 2 described with reference to FIG. 1 and the DU 200 described with reference to FIG. 2 may also refer to apparatuses corresponding to each other.

Also, the characteristics required in the fronthaul between the BBU 1 and the RRH 2 may be different from those required in the midhaul between the CU 100 and the DU 200. For example, the characteristics required in the fronthaul and midhaul may mean communication characteristics such as transport latency, jitter, required bandwidth, and the like.

Also, as explained with reference to FIGS. 1 and 2, networks between the plurality of apparatuses performing the plurality of divided functions of the base station in the communication network may be classified into the fronthaul network and the midhaul network based on positions where the functions of the base station are divided in the protocol stack.

Hereinafter, an operation method of a communication node in a communication network according to an embodiment of the present disclosure and a communication node performing the same will be described. Specifically, an operation method of a communication node in a communication network according to an embodiment of the present disclosure may be described based on the concepts of CU 100 and DU 200 described with reference to FIG. 2. For example, a communication node to be described below may mean an apparatus such as a CU, a DU, an RRH, or a BBU that supports or performs the plurality of divided functions of the base station.

Figure 3:
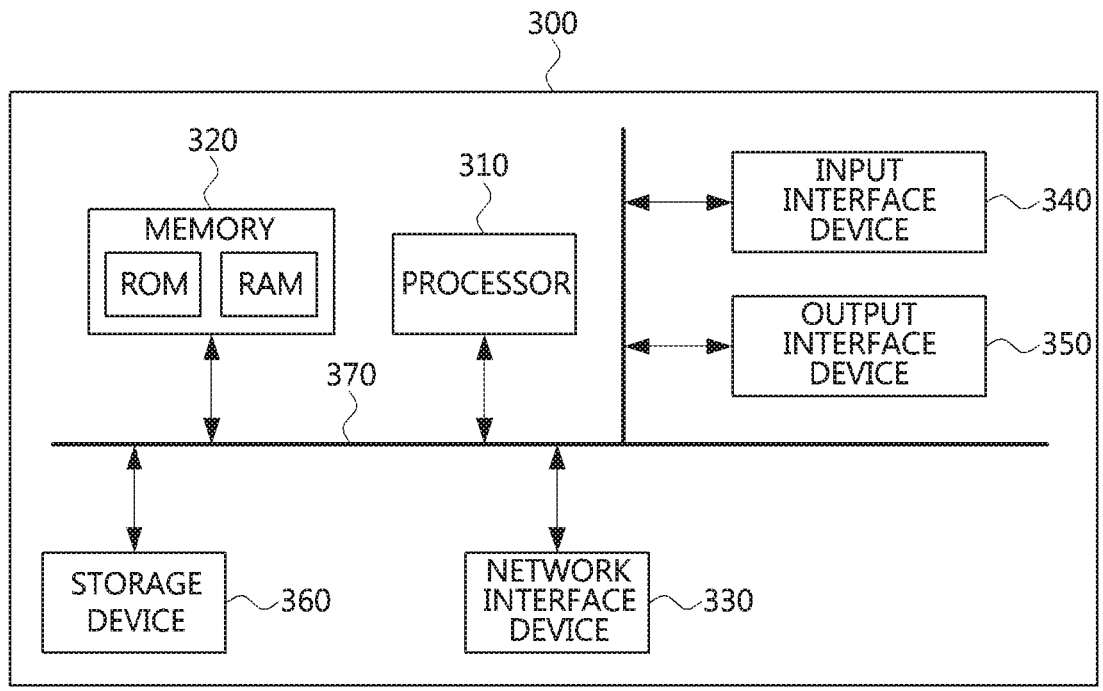
FIG. 3 is a block diagram illustrating a first communication node performing an operation method of a communication node in a communication network according to an embodiment of the present disclosure.

FIG. 3 is a block diagram illustrating a first communication node performing an operation method of a communication node in a communication network according to an embodiment of the present disclosure.

Referring to FIG. 3, a first communication node 300 according to an embodiment of the present disclosure may be an apparatus supporting or performing at least one function of a plurality of divided functions of a base station in a communication network.

Specifically, the communication node 300 may comprise at least one processor 310, a memory 320, and a network interface device 330 connected to the network for performing communications. Also, the communication node 300 may further comprise an input interface device 340, an output interface device 350, a storage device 360, and the like. Each component included in the communication node 300 may communicate with each other as connected through a bus 370.

The processor 310 may execute a program which is stored in at least one of the memory 320 and the storage device 360 and includes at least one instruction. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM). Here, the program includes at least one instruction executed by the processor 310, which implements a plurality of steps for proposed operation methods of a communication node.

Figure 4:
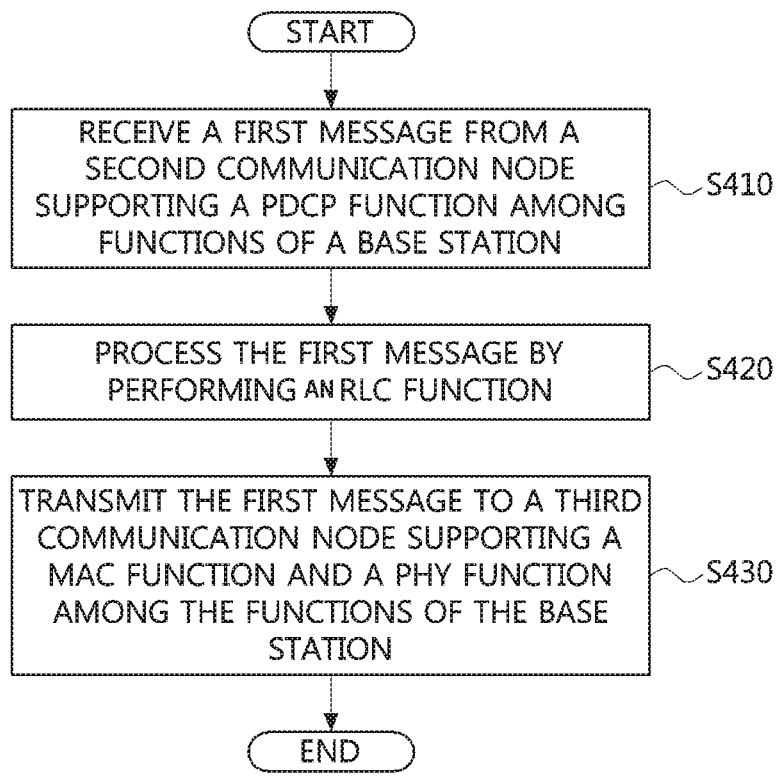
FIG. 4 is a flowchart for explaining an operation method of a communication node in a communication network according to a first embodiment of the present disclosure.

FIG. 4 is a flowchart for explaining an operation method of a communication node in a communication network according to a first embodiment of the present disclosure.

Referring to FIG. 4, an operation method of a communication node in a communication network according to a first embodiment of the present disclosure may be performed in the first communication node described with reference to FIG. 3. Also, the communication network may be a cloud or centralized radio access network (C-RAN) where the functions of a base station are divided and supported or performed by a plurality of apparatuses.

In FIG. 4, it may be assumed that the first communication node supports the RLC function among the functions of the base station. Here, the RLC function may include a function of segmenting a message into a plurality of message fragments, and a function of concatenating the segmented message fragments based on a sequence.

First, the first communication node may receive a first message from a second communication node supporting the PDCP function among the functions of the base station (S410). Here, the PDCP function may include a function of compressing an IP header of a message if the IP header of the message is not compressed, and a function of decompressing an IP header of a message if the IP header of the message is compressed. The PDCP function may also include a function of encrypting an unencrypted message and a function of decrypting an encrypted message.

Thereafter, the first communication node may process the first message received from the second communication node by performing the RLC function (S420). For example, the first communication node may process the received first message by performing the function of segmenting the received first message into a plurality of message fragments.

Then, the first communication node may transmit the processed first message to a third communication node supporting the MAC function and the PHY function among the functions of the base station (S430). Here, the MAC function may include a HARQ retransmission control function and an uplink (UL) or downlink (DL) scheduling function. In addition, the PHY function may include a coding function, a decoding function, a modulation function, a demodulation function, an antenna and resource mapping function, and an antenna and resource demapping function.

Meanwhile, the third communication node may receive the first message from the first communication node. Then, the third communication node may process the first message received from the first communication node by performing the MAC function and the PHY function among the functions of the base station. For example, the third communication node may perform a DL scheduling function among a plurality of functions included in the MAC function, and may perform the coding function, the modulation function, and the antenna and resource mapping function among the plurality of functions included in the PHY function to process the received first message.

Through the above-described method, the first communication node, the second communication node, and the third communication node in the communication network may support or perform the plurality of divided functions of the base station. That is, through the method as described above, the first communication node in the communication network may transmit the first message to the third communication node via the second communication node.

In the above description, it was explained that the first message is transmitted from the second communication node to the third communication node through the first communication node. Similarly, a message may also be transmitted from the third communication node to the second communication node through the first communication node.

Specifically, in the communication network, when the third communication node receives the message, the third communication node may process the received message by performing the MAC function and the PHY function. For example, the third communication node may perform the decoding function, the demodulation function, the antenna and resource demapping among the plurality of functions included in the PHY function, and the UL scheduling function included in the plurality of functions included in the MAC function. The third communication node may then transmit the processed message to the first communication node supporting the RLC function.

Accordingly, the first communication node may receive the message from the third communication node. The first communication node may then process the message received from the third communication node by performing the RLC function. For example, the first communication node may process the message received from the third communication node by performing the function of concatenating a plurality of message fragments of the message included in the received message among the plurality of functions included in the RLC function based on a sequence. The first communication node may then transmit the processed message to the second communication node supporting the PDCP function.

Accordingly, the second communication node may receive the message from the first communication node. The second communication node may then process the message received from the first communication node by performing the PDCP function. For example, the first communication node may process the received message by performing the function of decrypting the message and decompressing the IP header among the plurality of functions included in the PDCP function.

Hereinafter, with reference to FIG. 5, a method of dividing functions of a base station in a communication network according to a second embodiment of the present disclosure will be described.

Figure 5:
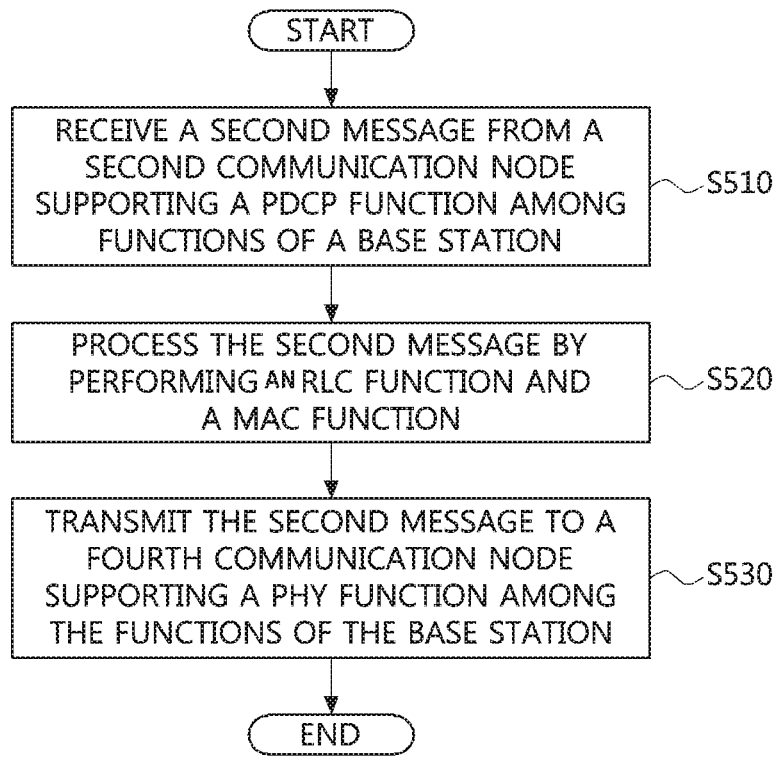
FIG. 5 is a flowchart for explaining an operation method of a communication node in a communication network according to a second embodiment of the present disclosure.

FIG. 5 is a flowchart for explaining an operation method of a communication node in a communication network according to a second embodiment of the present disclosure.

Referring to FIG. 5, an environment of a communication network according to a second embodiment of the present disclosure may be the same as the environment of the communication network illustrated in FIG. 4. That is, the communication network according to the second embodiment of the present disclosure may mean the same communication network as the communication network according to the first embodiment.

In FIG. 5, it may be assumed that the first communication node supports the RLC function among the functions of the base station and further supports the MAC function of the base station. First, the first communication node may receive a second message from the second communication node supporting the PDCP function among the functions of the base station (S510).

Thereafter, the first communication node may process the second message received from the second communication node by performing the RLC function and the MAC function (S520). Thereafter, the first communication node may transmit the processed second message to a fourth communication node supporting the PHY function (S430).

Through the method as described above, the first communication node, the second communication node, and the fourth communication node in the communication network may support or perform the plurality of divided functions of the base station. Specifically, a method of supporting the plurality of divided functions of the base station described with reference to FIG. 5 in the first communication node, the second communication node, and the fourth communication node will be described with reference to FIG. 6 below.

Figure 6:
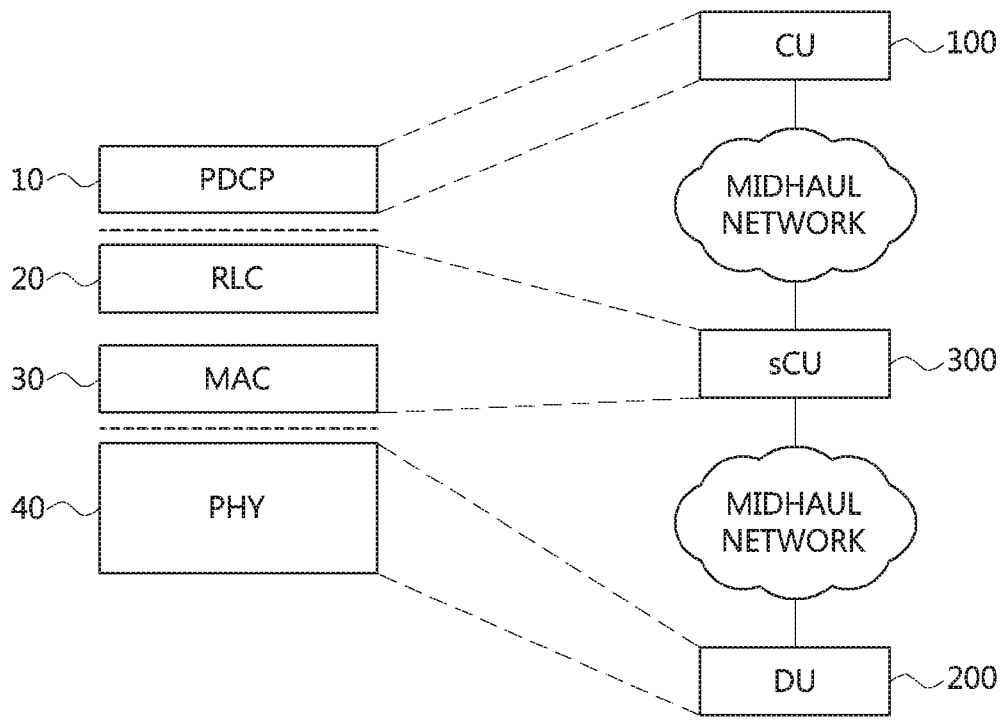
FIG. 6 is a conceptual diagram illustrating an operation method of a communication node in a communication network according to a second embodiment of the present disclosure.

FIG. 6 is a conceptual diagram illustrating an operation method of a communication node in a communication network according to a second embodiment of the present disclosure.

Referring to FIG. 6, the first communication node performing the operation method according to the second embodiment of the present disclosure may be referred to as a semi centralized unit (sCU) 300. That is, the sCU 300 illustrated in FIG. 6 may refer to the first communication node 300 described with reference to FIGS. 3 and 4.

Also, the second communication node performing the operation method according to the second embodiment of the present disclosure may be referred to as the CU 100, and the fourth communication node may be referred to the DU 200.

Specifically, in the communication network, the CU 100 may support the PDCP function 10 among the plurality of divided functions of the base station. Also, in the communication network, the sCU 300 may support the RLC function 20 and the MAC function 30 among the plurality of divided functions of the base station. Also, in the communication network, the DU 200 may support the PHY function 40 among the plurality of divided functions of the base station.

When the functions of base station are divided in such the manners, a network between the CU 100 and the sCU 300 and a network between the sCU 300 and the DU 200 in the communication network may be defined as midhaul networks.

Hereinafter, with reference to FIG. 7, a method of dividing functions of a base station in a communication network according to a third embodiment of the present disclosure will be described.

Figure 7:
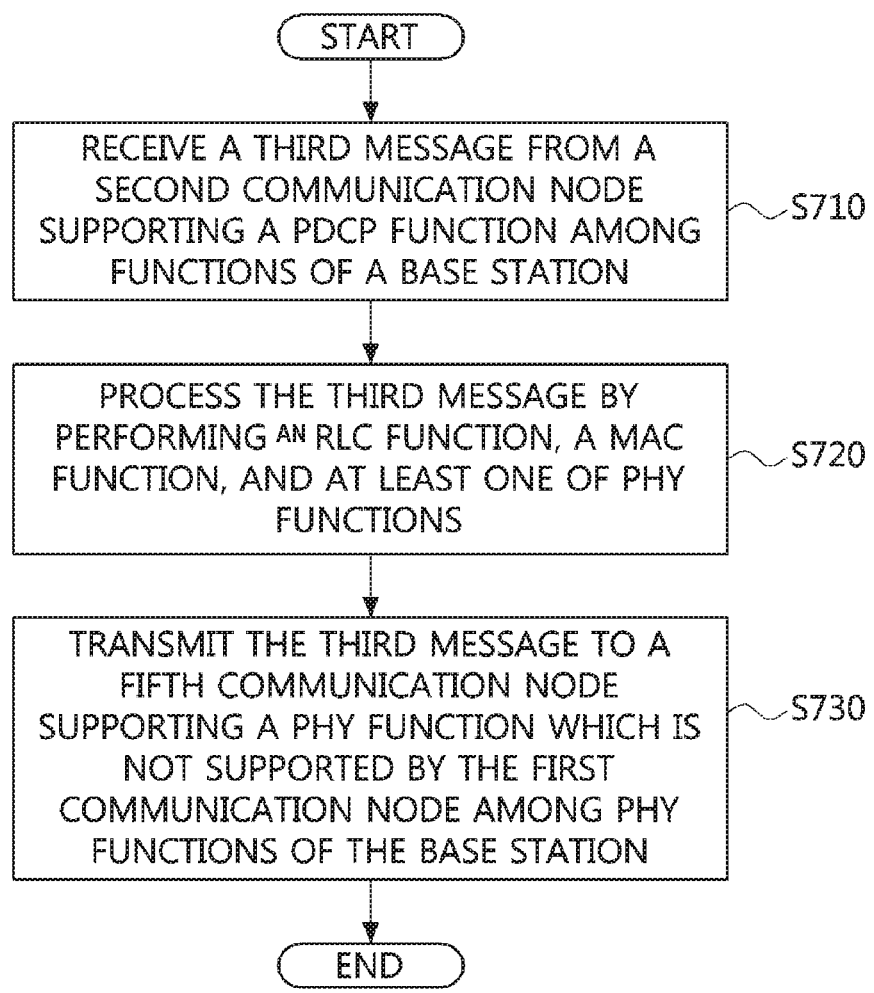
FIG. 7 is a flowchart for explaining an operation method of a communication node in a communication network according to a third embodiment of the present disclosure.

FIG. 7 is a flowchart for explaining an operation method of a communication node in a communication network according to a third embodiment of the present disclosure.

Referring to FIG. 7, an environment of a communication network according to a third embodiment of the present disclosure may be the same as the environments of the communication network described in FIG. 4 and the communication network according to the second embodiment. That is, the communication network according to the third embodiment of the present disclosure may be the same communication network as the communication network according to the first embodiment and the communication network according to the second embodiment.

In FIG. 7, it may be assumed that a first communication node supports the RLC function and the MAC function among the functions of the base station and further supports at least one function among the PHY functions of base station. First, the first communication node may receive a third message from a second communication node supporting the PDCP function among the functions of the base station (S710).

Thereafter, the first communication node may process the third message received from the second communication node by performing the RLC function, the MAC function, and at least one of the PHY function which the first communication node further supports (S720). Thereafter, the first communication node may transmit the processed third message to a fifth communication node supporting a PHY function not supported by the first communication node among the PHY functions of the base station (S730).

Through the method as described above, the first communication node, the second communication node, and the fifth communication node in the communication network may support or perform the plurality of divided functions of the base station.

Hereinafter, a method of dividing the functions of the base station in the communication network according to the third embodiment of the present disclosure will be described with reference to FIG. 8.

Figure 8:
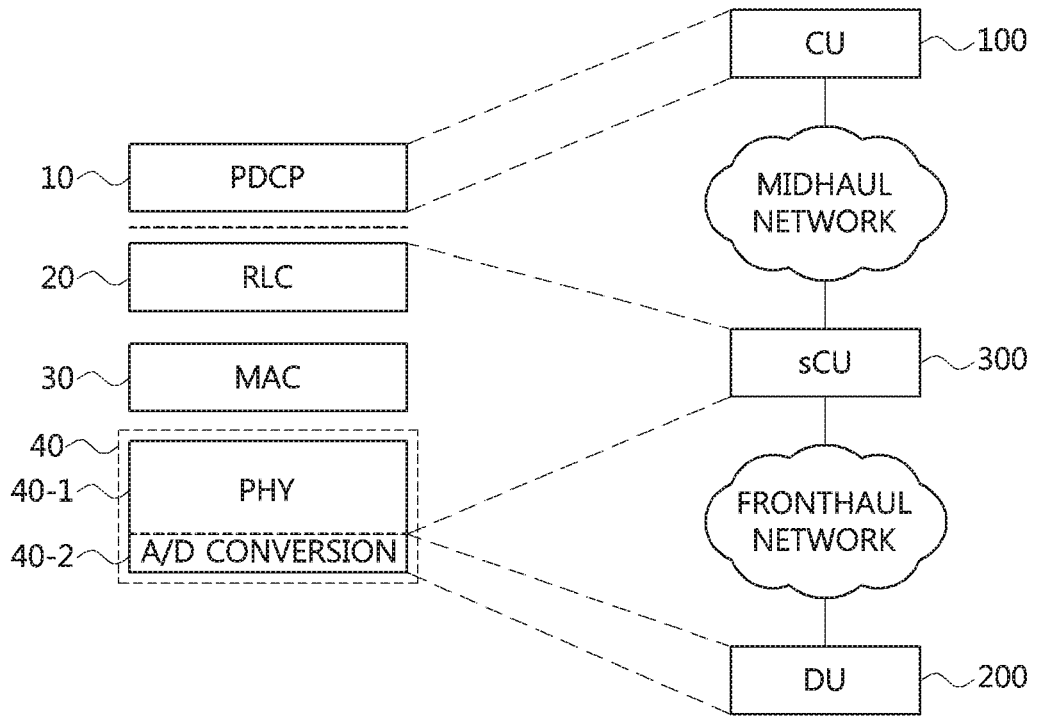
FIG. 8 is a conceptual diagram illustrating an operation method of a communication node in a communication network according to a third embodiment of the present disclosure.

FIG. 8 is a conceptual diagram illustrating an operation method of a communication node in a communication network according to a third embodiment of the present disclosure.

Referring to FIG. 8, the first communication node performing the operation method according to the third embodiment of the present disclosure may be referred to as the sCU 300. That is, the sCU 300 illustrated in FIG. 8 may refer to the first communication node 300 described with reference to FIG. 3, FIG. 4, and FIG. 7.

Also, the second communication node performing the operation method according to the third embodiment of the present disclosure may be referred to as the CU 100, and the fifth communication node may be referred to as the DU 200.

Specifically, in the communication network, the CU 100 may support the PDCP function 10 among the plurality of divided functions of the base station. Also, in the communication network, the sCU 300 may support the RLC function 20, the MAC function 30, and at least one function 40-1 of the PHY functions 40 among the plurality of divided functions of the base station. Also, in the communication network, the DU 200 may support a PHY function 40-2 which is not supported by the first communication node among the plurality of PHY functions of base station. That is, in the communication network, the sCU 300 and the DU 200 may support the PHY functions that are not supported by each other among the PHY functions of base station. Here, the PHY function performed in the sCU 300 and the PHY function performed in the DU 200 may mean functions divided from the PHY functions of base station based on the CPRI.

When the functions of the base station are divided in such the manner, a network between the CU 100 and the sCU 300 in the communication network may be defined as a midhaul network. Also, in the communication network, a network between the sCU 300 and the DU 200 may be defined as a fronthaul network.

As described with reference to FIGS. 4 to 8, the operation methods according to the present disclosure may include specific methods of dividing functions of a base station into a plurality of entities (apparatuses).

Specifically, the functions of the base station may be divided based on the characteristics required in the network between the plurality of communication nodes performing the divided functions of the base station in the protocol stack of the communication network.

For example, the characteristics required in the network between the first communication node and the second communication node described with reference to FIG. 4 may be different from those required in the network between the first communication node and the third communication node.

Also, the characteristics required in the network between the first communication node and the second communication node described with reference to FIG. 5 may be different from those required in the network between the first communication node and the third communication node.

Also, the characteristics required in the network between the first communication node and the second communication node described with reference to FIG. 7 may be different from those required in the network between the first communication node and the fifth communication node.

As described above, the network between the plurality of communication nodes that perform the plurality of divided functions of base station in the communication network will be specifically described with reference to FIGS. 9 to 11.

Figure 9:
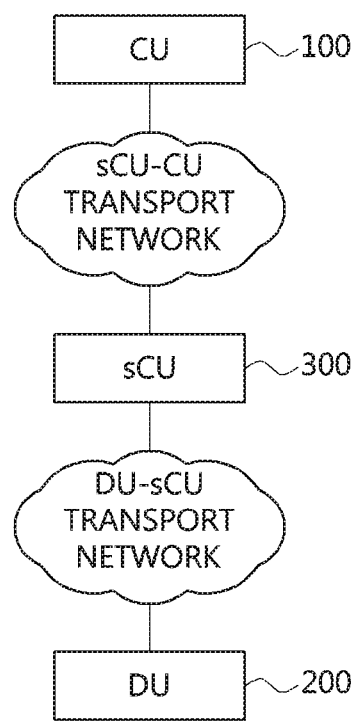
FIG. 9 is a conceptual diagram illustrating a first embodiment of a communication network of the present disclosure.

FIG. 9 is a conceptual diagram illustrating a first embodiment of a communication network of the present disclosure.

Referring to FIG. 9, the network between the CU 100 and the sCU 300 and the network between the sCU 300 and the DU 200 included in the communication network according to the present disclosure may be defined as separate networks.

Specifically, the network between the CU 100 and the sCU 300 in the communication network may be defined as an 'sCU-CU transport network'. Also, the network between the sCU 300 and the DU 200 in the communication network may be defined as a 'DU-sCU transport network'.

Figure 10:
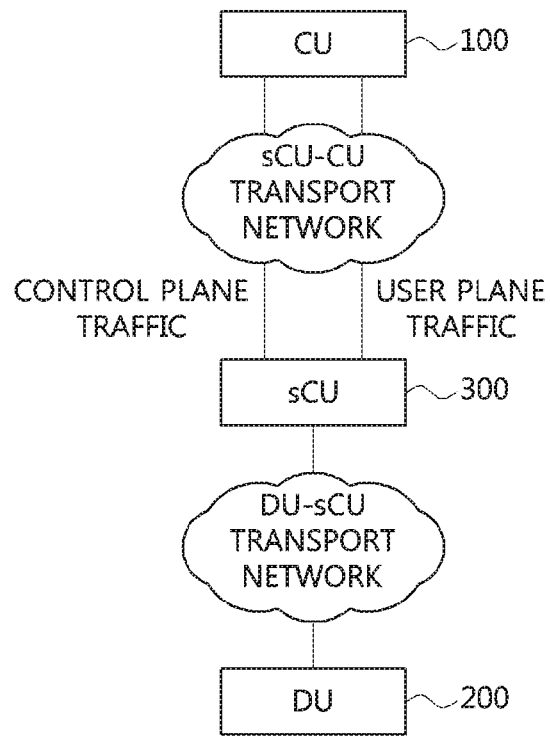
FIG. 10 is a conceptual diagram illustrating a first embodiment of characteristics of networks between communication nodes in a communication network according to a first embodiment of the present disclosure.
Figure 11:
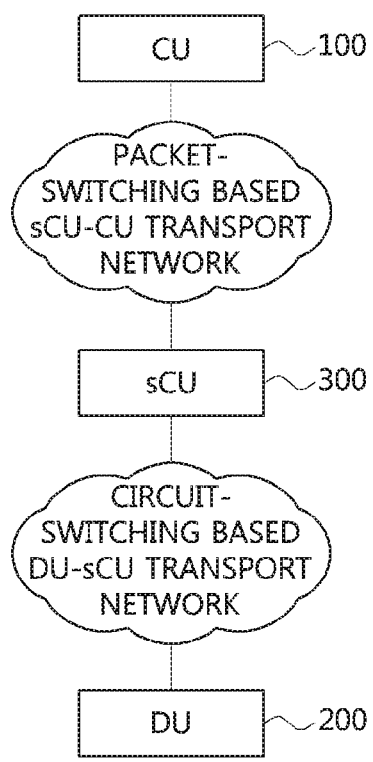
FIG. 11 is a conceptual diagram illustrating a second embodiment of characteristics of networks between communication nodes in a communication network according to a first embodiment of the present disclosure.

For example, in the communication network, the sCU-CU transport network and the DU-sCU transport network may be networks having different characteristics as shown in FIGS. 10 and 11.

FIG. 10 is a conceptual diagram illustrating a first embodiment of characteristics of networks between communication nodes in a communication network according to a first embodiment of the present disclosure.

Referring to FIG. 10, the network between the CU 100 and the sCU 300 in the communication network may be a network in which a control plane and a user plane are separated. In such the case, the network between the sCU 300 and the DU 200 in the communication network may be a network in which a control plane and a user plane are not separated.

Accordingly, in the communication network, the sCU 300 may distinguish the traffic type of messages transmitted and received with the CU 100. For example, in the communication network, when a message is received from the DU 200, the sCU 300 may classify the traffic type of the received message into one of a control plane traffic and a user plane traffic, and transmit the message whose traffic type is classified to the CU 100.

FIG. 11 is a conceptual diagram illustrating a second embodiment of characteristics of networks between communication nodes in a communication network according to a first embodiment of the present disclosure.

Referring to FIG. 11, the sCU-CU transport network, which is the network between the CU 100 and the sCU 300 in the communication network, may be a 'packet-switching based sCU-CU transport network'. That is, messages exchanged between the CU 100 and the sCU 300 in the communication network may be transmitted and received based on a packet-switching scheme.

In this case, the DU-sCU transport network, which is the network between the sCU 300 and the DU 200 in the communication network, may be a 'circuit-switching based DU-sCU transport network'. That is, messages exchanged between the sCU 300 and the DU 200 may be transmitted and received based on a circuit-switching scheme.

Hereinafter, a fourth embodiment in which functions of a base station are divided into a plurality of entities will be described in detail.

Figure 12:
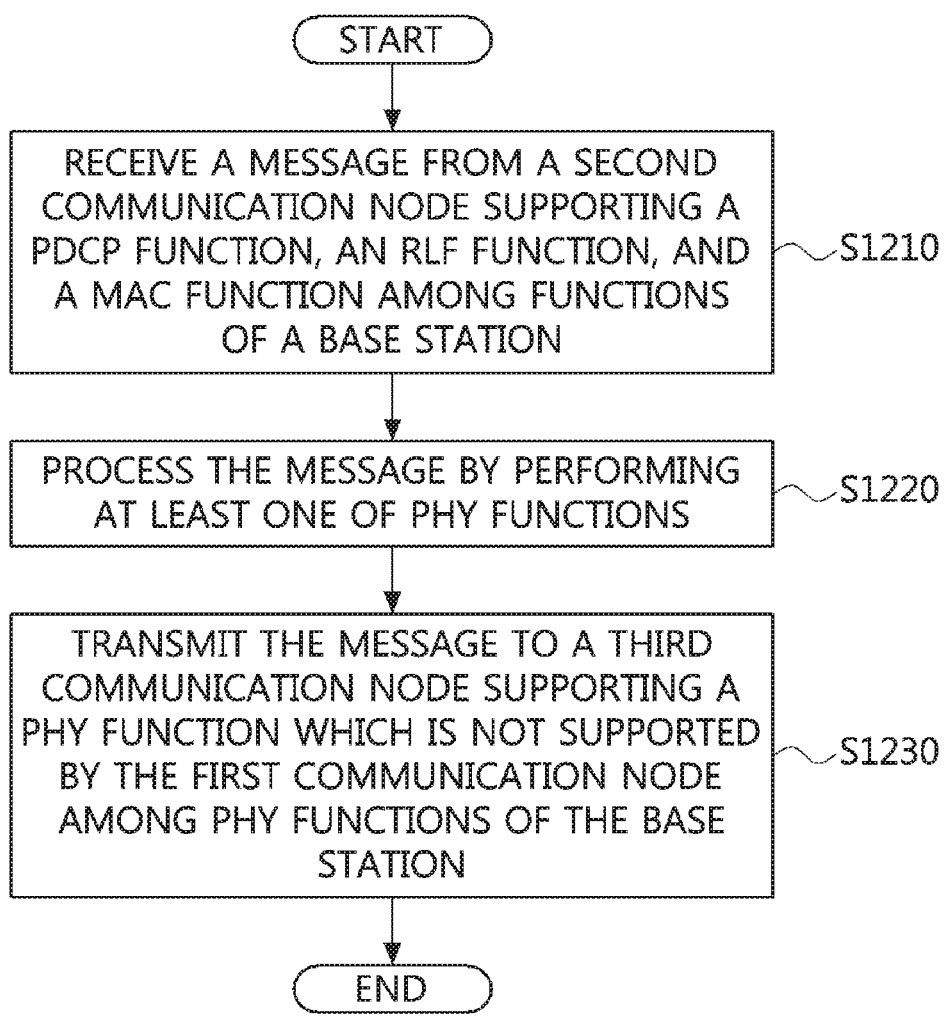
FIG. 12 is a flowchart for explaining an operation method of a communication node of a communication network according to a fourth embodiment of the present disclosure.

FIG. 12 is a flowchart for explaining an operation method of a communication node of a communication network according to a fourth embodiment of the present disclosure.

Referring to FIG. 12, a first communication node in a communication network may be described as supposing that the first communication node supports at least one function among the PHY functions of the base station. First, the first communication node may receive a message from a second communication node supporting the PDCP function, the RLC function, and the MAC function among the functions of the base station (S1210). Here, the second communication node illustrated in FIG. 12 may mean a communication node different from the second communication node illustrated in FIGS. 4, 5, and 7.

Thereafter, the first communication node may process the message received from the second communication node by performing at least one function supported by the first communication node among the PHY functions of the base station (S1220). Thereafter, the first communication node may transmit the processed message to a third communication node supporting the PHY function not supported by the first communication node among the PHY functions of base station (S1230). Here, the third communication node illustrated in FIG. 12 may mean a communication node different from the third communication node illustrated in FIGS. 4, 5, and 7.

That is, in the communication network according to the fourth embodiment of the present disclosure, the first communication node and the third communication node may support the PHY functions which are not supported by each other. Here, the PHY function performed by the first communication node and the PHY function performed by the third communication node may be divided based on the CPRI.

Also, in the communication network according to the fourth embodiment of the present disclosure, the network between the first communication node and the second communication node may be a packet-switching based network. In such the case, the network between the first communication node and the third communication node in the communication network may be a circuit-switching based network.

Through the above-described method, the first communication node, the second communication node, and the third communication node in the communication network may support or perform the plurality of divided functions of the base station.

Hereinafter, with reference to FIGS. 13 to 15, a plurality of embodiments of configurations of the communication network according to the present disclosure will be described. Specifically, the CU, the sCU, and the DU that perform the plurality of divided functions of the base station in the communication network will be described as examples.

Figure 13:
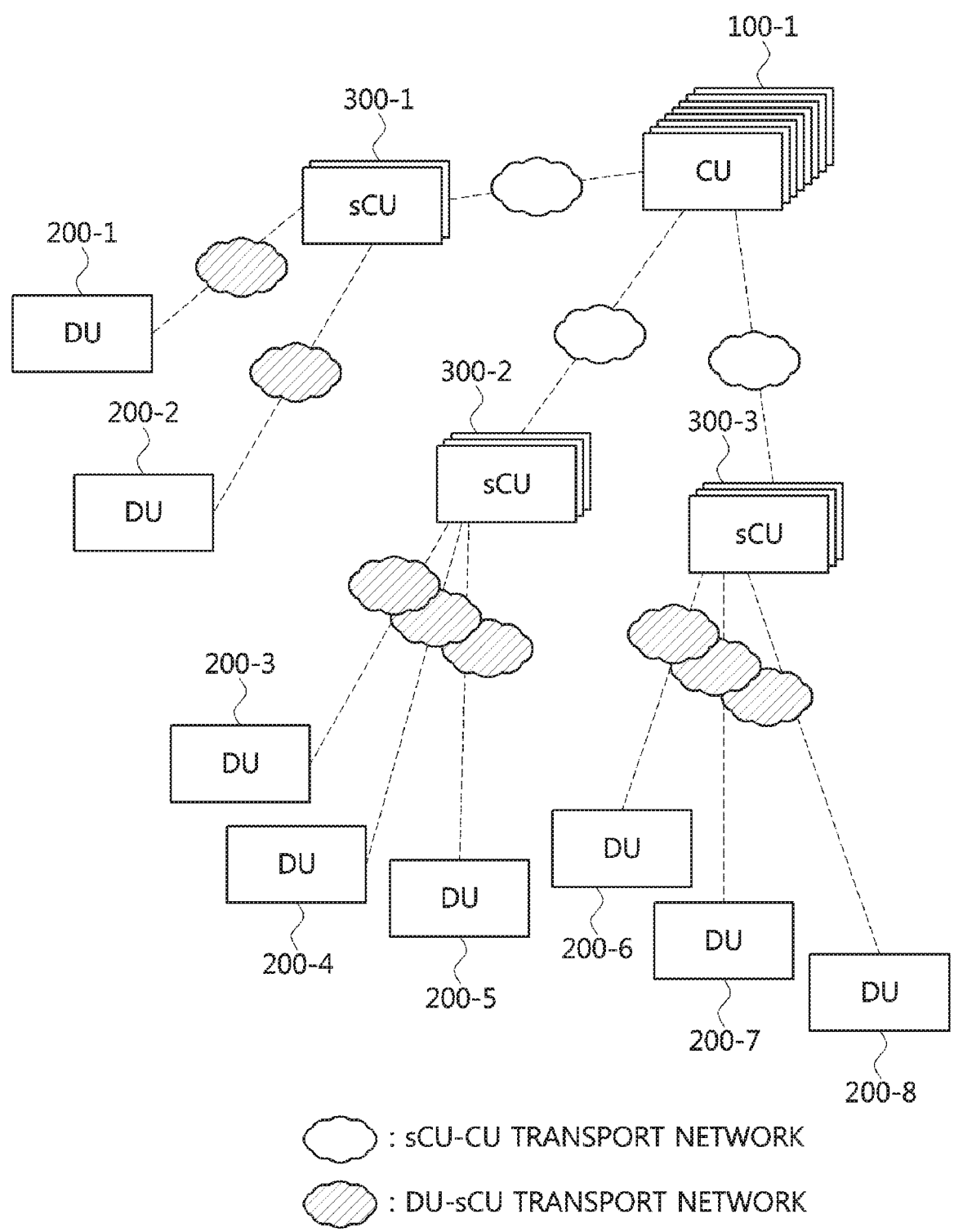
FIG. 13 is a conceptual diagram illustrating a first embodiment of a communication network according to an embodiment of the present disclosure.

FIG. 13 is a conceptual diagram illustrating a first embodiment of a communication network according to an embodiment of the present disclosure.

Referring to FIG. 13, in a communication network according to an embodiment of the present disclosure, a first base station may include a first CU, a first sCU, and a first DU 200-1 that perform a plurality of divided functions of the first base station. Also, in the communication network, a second base station may include a second CU, a second sCU, and a second DU 200-2 that perform a plurality of divided functions of the second base station. In this way, the plurality of base stations may include CU, sCU, and DU that perform their divided functions.

Specifically, a plurality of DUs in the communication network may be installed at physically separated locations. That is, the plurality of DUs may include the first DU 200-1, the second DU 200-2, a third DU 200-3, a fourth DU 200-4, a fifth DU 200-5, a sixth DU 200-6, a seventh DU 200-7, and an eighth DU 200-8, and each DU may be installed at a physically separated location.

Also, in the communication network, a plurality of sCUs satisfying preset criteria may be installed concentrically at the same location. Here, the preset criteria may include a physical distance satisfying conditions required for functional split of the DU and the sCU, the number of network hops satisfying the conditions required for the functional split of the DU and the sCU, requirements of functions performed in the sCU, or requirements according to type of messages transmitted and received through the sCU.

For example, if the functions of the base station performed in the first sCU and the second sCU in the communication network are the same, the first sCU and the second sCU may be installed at the same position. Specifically, the first sCU and the second sCU may be installed as included in a first sCU set 300-1 to facilitate easier management and operation. Here, a network between the first DU 200-1 and the first sCU and a network between the second DU 200-2 and the second sCU may be respectively configured as separate DU-sCU transport networks.

For example, if the base station functions performed in the third sCU, the fourth sCU, and the fifth sCU in the communication network are the same, the third sCU, the fourth sCU, and the fifth sCU may be installed at the same position. Specifically, the third sCU, the fourth sCU, and the fifth sCU may be installed as included in a second sCU set 300-2 to facilitate easier management and operation. Here, a network between the second DU 200-3 and the third sCU, a network between the fourth DU 200-4 and the fourth sCU, and a network between the fifth DU 200-5 and the fifth sCU may be respectively configured as separate DU-sCU transport networks.

For example, if the base station functions performed in the sixth sCU, the seventh sCU, and the eighth sCU in the communication network are the same, the sixth sCU, the seventh sCU, and the eighth sCU may be installed at the same position. Specifically, the sixth sCU, the seventh sCU, and the eighth sCU may be installed as included in a third sCU set 300-3 to facilitate easier management and operation. Here, a network between the sixth DU 200-6 and the sixth sCU, a network between the seventh DU 200-7 and the seventh sCU, and a network between the eighth DU 200-8 and the eighth sCU may be respectively configured as separate DU-sCU transport networks.

Also, in the communication network, a plurality of CUs for each sCU set satisfying the preset criteria may be installed concentrically at the same location. Here, the preset criteria may include a physical distance satisfying conditions required for functional split of the CU and the sCU, the number of network hops satisfying the conditions required for the functional split of the CU and the sCU, requirements according to type of messages transmitted and received through the sCU set, or the locations where the sCU set is installed.

For example, if the distances among the first sCU set 300-1, the second sCU set 300-2, and the third sCU set 300-3 in the communication network is less than a predetermined threshold value, a plurality of CUs for the first sCU set 300-1, the second sCU set 300-2, and the third sCU set 300-3 may be installed at the same location. Specifically, the plurality of CUs for the first sCU set 300-1, the second sCU set 300-2, and the third sCU set 300-3 may be installed as included in a first CU set 100-1 to facilitate easier management and operation. Here, a network between the first sCU set 300-1 and the first CU set 100-1, a network between the second sCU set 300-2 and the first CU set 100-1, and a network between the third sCU set 300-3 and the first CU set 100-1 may be respectively configured as separate sCU-CU transport networks.

Figure 14:
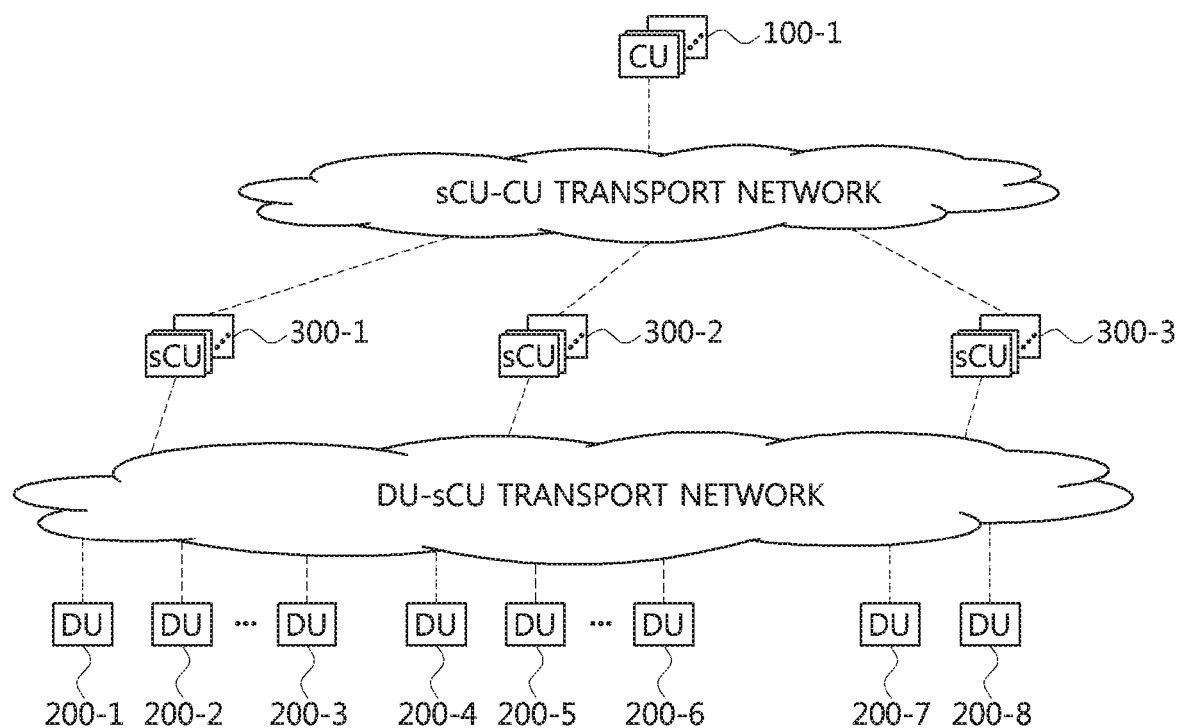
FIG. 14 is a conceptual diagram illustrating a second embodiment of a communication network according to an embodiment of the present disclosure.

FIG. 14 is a conceptual diagram illustrating a second embodiment of a communication network according to an embodiment of the present disclosure.

Referring to FIG. 14, in a communication network according to an embodiment of the present disclosure, networks between and a plurality of DUs and a plurality of sCU sets including a plurality sCUs may be configured as a DU-sCU transport network. Specifically, a network among the first DU 200-1 and the second DU 200-2 and the first sCU set 300-1, a network among the third DU 200-3, the fourth DU 200-4, and the fifth DU 200-5 and the second sCU set 300-2, and a network among the sixth DU 200-6, the seventh DU 200-7, and the eighth DU 200-8 and the third sCU set 300-3 may be configured as a DU-sCU transport network.

Also, in the communication network, a network among the plurality of sCU sets including the first sCU set 300-1, the second sCU set 300-2, and the third sCU set 300-3 and the first CU set 100-1 including the plurality of CUs may be configured as a sCU-CU transport network. Specifically, a network between the first sCU 300-1 and the first CU set 100-1, a network between the second sCU 300-2 and the first CU set 100-1, and a network between the sCU 300-3 and the first CU set 100-1 may be configured as a sCU-CU transport network.

Figure 15:
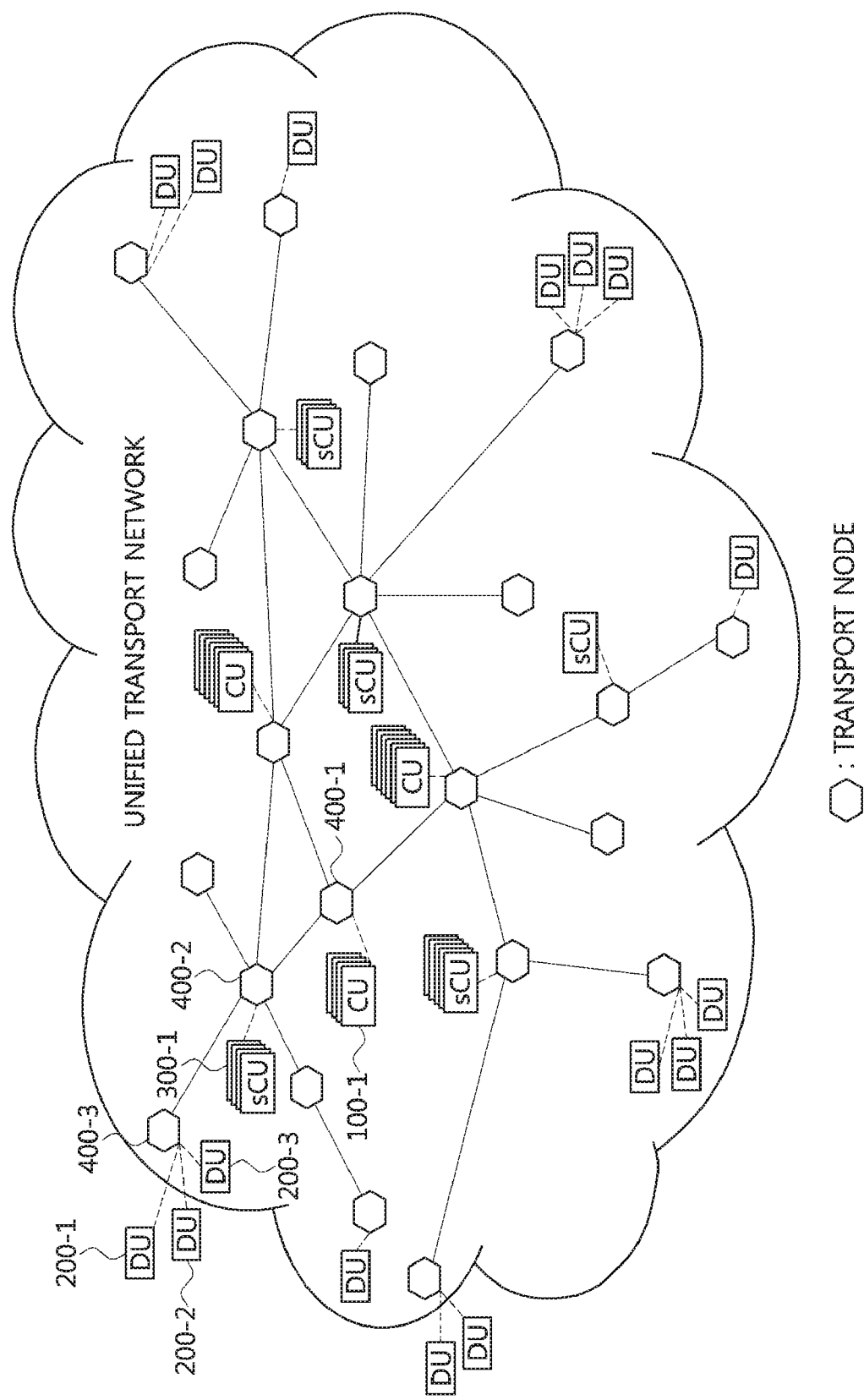
FIG. 15 is a conceptual diagram illustrating a third embodiment of a communication network according to an embodiment of the present invention.

FIG. 15 is a conceptual diagram illustrating a third embodiment of a communication network according to an embodiment of the present invention.

Referring to FIG. 15, in a communication network according to an embodiment of the present disclosure, a plurality of DUs, a plurality of sCU sets, and a plurality of CU sets may be configured as a 'unified transport network'. Here, the unified transport network may include the plurality of DUs, the plurality of sCU sets, and the plurality of CU sets, and a plurality of transport nodes which controls messages transmitted and received through the plurality of DUs, the plurality of sCU sets, and the plurality of CU sets.

Specifically, messages transmitted to and received from a plurality of CUs included in the first CU set 100-1 in the communication network may be controlled by a first transport node 400-1. Also, messages transmitted to and received from a plurality of sCUs included in the first sCU set 300-1 may be controlled by a second transport node 400-2. Also, messages transmitted and received from through the first DU 200-1, the second DU 200-2, and the third DU 200-3 may be controlled by a third transport node 400-3.

For example, in case that a first CU included in the first CU set 100-1 attempts to transmit a message to the first DU 200-1, the first CU included in the first CU set 100-1 may transmit the message to the first transport node (400-1). Thereafter, the first transport node 400-1 may receive the message from the first CU included in the first CU set 100-1. Then, the first transport node 400-1 may transmit the message received from the first CU to the second transport node 400-2 which controls the message of the second sCU. Thereafter, the second transport node 400-2 may receive the message from the first transport node 400-1. Then, the second transport node 400-2 may transmit the message received from the first transport node 400-1 to the third transport node 400-3 controlling the messages of the first DU 200-1. Then, the third transport node 400-3 may transmit the message received from the second transport node 400-2 to the first DU 200-1. Through the method as described above, the first CU included in the first CU set 100-1 in the communication network can transmit the message to the first DU 200-1.

As described with reference to FIGS. 3 to 15, an operation method of a communication node in a communication network according to the present disclosure can support division of a plurality of functions of a base station on a plurality of layers included in a protocol stack. Accordingly, the operation methods according to the present disclosure can properly divide the functions of the base station into a plurality of apparatuses in consideration of the characteristics required in the network between the apparatuses performing the divided functions of the base station.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node comprising an apparatus that supports or performs a plurality of functions of a base station, which supports a radio link control (RLC) function and a medium access control (MAC) function, and at least one of physical layer (PHY) functions among functions of a base station, the operation method comprising:

receiving a first message from a second communication node comprising an apparatus that supports or performs a plurality of functions of the base station supporting a packet data convergence protocol (PDCP) function among the functions of the base station;

processing the received first message by performing the RLC function and the MAC function; and transmitting the processed first message to a third communication node comprising an apparatus that supports or performs a plurality of functions of the base station supporting physical (PHY) functions among the functions of the base station, wherein the functions of the base station are divided based on characteristics required at an interface between the first communication node and the second communication node and characteristics required at an interface between the first communication node and the third communication node in a protocol stack of a communication network between the base station and a user equipment (UE), wherein a network between the first communication node and the second communication node is a midhaul network different from the communication network between the base station and the UE, and a network between the first communication node and the third communication node is a fronthaul network different from the communication network between the base station and the UE, and wherein the midhaul network is a network connecting a plurality of communication nodes including the first communication node and the second communication node, and the fronthaul network is a network connecting the first communication node and a plurality of communication nodes including the third communication node.

2. The operation method according to claim 1, wherein the midhaul network is a network in which a control plane and a user plane are separated.

3. The operation method according to claim 1, wherein, when the midhaul network is a packet-switching based network, and the fronthaul network is a circuit-switching based network or a packet-switching based network.

4. The operation method according to claim 1, wherein the midhaul is different from the fronthaul network.

5. The operation method according to claim 1, wherein the midhaul network and the fronthaul network are integrated into a unified network.

6. An operation method of a first communication node comprising an apparatus that supports or performs a plurality of functions of a base station, which supports a radio link control (RLC) function, a medium access control (MAC) function, and at least one of physical layer (PHY) functions among functions of a base station, the operation method comprising:

receiving a first message from a second communication node comprising an apparatus that supports or performs a plurality of functions of the base station supporting a packet data convergence protocol (PDCP) function among the functions of the base station;

processing the received first message by performing the RLC function, the MAC function, and the at least one of the PHY functions; and transmitting the processed first message to a third communication node comprising an apparatus that supports or performs a plurality of functions of the base station supporting a PHY function which is not supported by the first communication node among the PHY functions of the base station, wherein the functions of the base station are divided based on characteristics required at an interface between the first communication node and the second communication node and characteristics required at an interface between the first communication node and the third communication node in a protocol stack of a communication network between the base station and a user equipment (UE), wherein a network between the first communication node and the second communication node is a midhaul network different from a communication network between the base station and the UE, and a network between the first communication node and the third communication node is a fronthaul network different from the communication network between the base station and the UE, and wherein the midhaul network is a network connecting a plurality of communication nodes including the first communication node and the second communication node, and the fronthaul network is a network connecting the first communication node and a plurality of communication nodes including the third communication node.

7. The operation method according to claim 6, wherein the at least one of the PHY functions is a function divided from the PHY functions based on a common public radio interface (CPRI).

8. The operation method according to claim 6, wherein the midhaul network is a network in which a control plane and a user plane are separated.

9. The operation method according to claim 6, wherein, when the midhaul network is a packet-switching based network, and the fronthaul network is a circuit-switching based network or a packet-switching based network.

10. The operation method according to claim 6, wherein the midhaul network and the fronthaul network are integrated into a unified network.

* * * * *